US008260673B2

(12) United States Patent
Arnold et al.

(10) Patent No.: US 8,260,673 B2
(45) Date of Patent: Sep. 4, 2012

(54) METHOD, SYSTEM AND COMPUTER PROGRAM PRODUCT FOR SELECTIVE DATA DISCLOSURE AND CONTRACT NEGOTIATION IN AN E-MARKETPLACE BASED ON PREDETERMINED PREFERENCES

(75) Inventors: Gordon K. Arnold, Cary, NC (US); David G. Kuehr-McLaren, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1626 days.

(21) Appl. No.: 10/435,191

(22) Filed: May 9, 2003

(65) Prior Publication Data

US 2004/0225574 A1    Nov. 11, 2004

(51) Int. Cl.
*G06Q 30/00* (2006.01)
(52) U.S. Cl. ............. 705/26; 705/1; 705/39; 705/44; 705/54; 705/77; 705/65; 705/5; 705/10; 705/78; 705/50; 705/53; 705/7; 713/186; 713/175; 713/158; 713/152; 713/157; 713/156
(58) Field of Classification Search .......... 705/26
See application file for complete search history.

(56) References Cited

U.S. PATENT DOCUMENTS

| | | | | |
|---|---|---|---|---|
| 5,745,574 | A * | 4/1998 | Muftic | 713/157 |
| 5,794,207 | A * | 8/1998 | Walker et al. | 705/77 |
| 5,862,325 | A * | 1/1999 | Reed et al. | 709/201 |
| 5,987,440 | A * | 11/1999 | O'Neil et al. | 705/44 |
| 6,757,710 | B2 * | 6/2004 | Reed | 709/203 |
| 6,950,808 | B1 * | 9/2005 | Kyojima et al. | 705/65 |
| 6,957,199 | B1 * | 10/2005 | Fisher | 705/78 |
| 6,959,281 | B1 * | 10/2005 | Freeling et al. | 705/10 |
| 2002/0046335 | A1 * | 4/2002 | Baum-Waidner | 713/156 |
| 2002/0069129 | A1 * | 6/2002 | Akutsu et al. | 705/26 |

(Continued)

FOREIGN PATENT DOCUMENTS

EP    0605106 A1    7/1994

(Continued)

OTHER PUBLICATIONS

An experimental examination of alternative forms of Web assurance for business-to-consumer e-commerce. Mauldin, Elaine; Arunachalam, Vairam. Journal of Information Systems , p. 33(34) , Winter 2001.*

(Continued)

*Primary Examiner* — F. Zeender
*Assistant Examiner* — Fawaad Haider
(74) *Attorney, Agent, or Firm* — Jeffrey T. Holman

(57) ABSTRACT

Parties involved in a transaction in an E-marketplace identify characteristics of a transaction that they are willing to accept and/or that they can provide. To do this, an attribute certificate is created for each party that contains the attributes of a buyer, seller, or third-party participant who will be transacting business in the particular E-marketplace. The attributes pertain to specifics of the transaction. The party submitting the attribute also identifies alternative conditions which, if they exist would be acceptable for conducting the transaction. Once these criteria, in the form of the attribute certificates, are received by the E-marketplace, the E-marketplace verifies the attributes. A server in the E-marketplace is configured to determine various combinations of participants that can match the deal criteria. In this manner, the E-marketplace "choreographs" the transaction to meet the needs of all.

20 Claims, 2 Drawing Sheets

U.S. PATENT DOCUMENTS

2002/0095454 A1* 7/2002 Reed et al. .................. 709/201
2003/0191677 A1* 10/2003 Akkiraju et al. ................ 705/8
2004/0002902 A1* 1/2004 Muehlhaeuser ............... 705/26

FOREIGN PATENT DOCUMENTS

| WO | WO 99/52242 | 10/1999 |
| WO | WO 99/66428 | 12/1999 |
| WO | WO 00/28452 | 5/2000 |
| WO | WO 00/29973 | 5/2000 |

OTHER PUBLICATIONS

Swindells & Henderson, "Legal regulation of electornic commerce," Journal of Information Law & Technology, No. 3 (1998) [Inspec Abstract Only].

Gerhard & Rohm, "A secure electronic market for anonymous transferable emission permits," Proceedings of the 31st Hawaii Intl. Conference on System Sciences (Cat. No. 98TB100216), Pt. vol. 4, pp. 232-241, Los Alamitos, CA (1998).

* cited by examiner

METHOD, SYSTEM AND COMPUTER PROGRAM PRODUCT FOR SELECTIVE DATA DISCLOSURE AND CONTRACT NEGOTIATION IN AN E-MARKETPLACE BASED ON PREDETERMINED PREFERENCES

BACKGROUND OF THE INVENTION

1. Field of the Invention

The present invention relates to computer-based on-line commerce in which sellers and buyers of goods or services are linked via an electronic marketplace where deals are negotiated and consummated.

2. Description of the Related Art

As networks of linked computers become an increasingly more prevalent concept in everyday life, on-line interactions between buyers and sellers have become commonplace. Transactions between a business and an individual consumer are referred to as business-to-consumer (B2C) transactions and transactions between businesses (e.g., the sale of goods from a wholesaler to a manufacturer who uses the purchased goods to eventually sell a product on the retail level) are referred to as business-to-business (B2B) transactions.

As a result of this increased use of networked computers to transact business, the concept of the electronic marketplace, referred to herein as the "E-marketplace," has emerged and become a standard form of conducting these business transactions. For a variety of reasons, the intermediary function provided by the E-marketplace is now an everyday part of transactional commerce.

On the consumer end, E-commerce sites such as E-Bay, half.com, Ubid.com, and AuctionPort.com provide an E-marketplace serving as a central location for negotiation of sales and/or auctions of products or services from a seller to a consumer (e.g., bidders). Likewise, B2B sellers, such as BizBuyer.com and FastParts.com, provide a similar intermediary service for business transactions between businesses.

Unlike a typical "brick-and-mortar" establishment where the buyer and seller will typically meet face-to-face and negotiate deals, and where the parties can guage reactions by watching and listening, in an E-marketplace no such interaction occurs and, in fact, it may be desirable for the identity of the parties to the transaction to be concealed. For example, if a large company is involved in a transaction, a party seeking to transact a deal with the large corporation may attempt to charge a higher price; similarly, a large corporation may give one price to a favored business partner while not wishing to give the same favorable terms to a first-time or occasional purchaser. In either case, it may be desirable for one or both of the parties to remain anonymous. However, even when a pseudonym is used for a transaction, existing methods of concealing identifies still fall short. For example, a bidder on E-Bay can be tracked across an auction by his user ID (often a pseudonym), and the bidder must also disclose his or her email address to vendors, in order to inquire about or to purchase an item. This information (user ID, email address, etc.) is the bidder's "bid history". Once this information is revealed, a seller can use the bidder's bid history to make contact, e.g., by sending multiple, continual emails presenting offers of items the bidder has shown interest in from past bids.

Another limitation of current E-marketplace systems is that, where strict purchase and/or sale requirements exist, there may not be in existence any one company that can meet the strict requirements, thereby limiting the options available for the party imposing the restrictions.

Verification-of-identity issues are also of concern in an E-marketplace since, unlike a face-to-face transaction, an E-marketplace transaction is essentially "faceless." However, under current E-marketplace scenarios, the only viable options available in the prior art are total security, where everything communicated between the buyer and seller is closed to all others, or the use of "public-key encryption", which allows the verification of identity information to protect very limited, static, encrypted information (e.g., credit card numbers), but all other information is open to the public and linkable to the public-key holder. The "total security" option prevents public negotiation and other advantages offered by a multi-vendor marketplace. Since a primary benefit of an E-Marketplace is its open nature which makes public negotiation available, security measures such as public-key certificates are typically employed in an E-marketplace environment.

As is well known, public key encryption systems involve the use of a publicly available public key in conjunction with a related private key available only to authorized persons or entities. Presentation of both keys is necessary to decrypt the information.

Attribute certificates were developed to augment public-key certificates. An attribute certificate has the same structure as a public-key certificate and is, in fact, a type of public key certificate. In addition to containing the public-key of the certificate holder, however, it also contains information (attributes) of the holder, and does not contain identity information. Instead, it can be linked to the public-key certificate of the holder. For example, attribute certificates have been used in the Health Care industry to identify the accreditation, certification(s) and role of a particular health care provider providing medical advice or information electronically. One of the benefits of using an attribute certificate is that unlike a public-key certificate, which stays essentially the same all the time, attributes are dynamic and thus may change frequently (e.g., additional certifications may be obtained, or the health care provider may have different roles depending on a situation). Attribute certificates can be issued with a limited lifetime so that they expire automatically, eliminating the administrative burden of having to continually revoke and revise certificates each time there is a change in an attribute. Applicant is unaware of any use of attribute certificates in connection with transactions in an E-marketplace or similar electronic transactional situation.

A problem exists where customers and vendors may impose strict purchase/sale restrictions for transactions and thus unnecessarily limit the available participants to the transaction and severely reduce the advantage of public negotiation offered by a multi-vender E-marketplace.

SUMMARY OF THE INVENTION

In accordance with the present invention, parties involved in a transaction in an E-marketplace identify characteristics of a transaction that they are willing to accept and/or that they can provide. To do this, an attribute certificate is created for each party that contains the attributes of a buyer or seller who will be transacting business in the particular E-marketplace. The attributes pertain to specifics of the transaction and/or attributes of the certificate holder that relate to the transaction. Such attributes include, but are not limited to, the volume of a product needed (e.g., 10,000 units per day for 2 years), the volume of product capable of being supplied (e.g., 100,000 units per month), credit information, payment history, delivery terms, bonding information, insurance information, ratings provided by third parties (e.g., the e-Marketplace, the Better Business Bureau, etc.), required licenses (e.g., retail license, toxic chemical license, etc.), state/federal certifications, industry certification, or international certifications.

In accordance with the present invention, the party submitting the attribute also identifies alternative conditions which, if they exist would be acceptable for conducting the transaction. For example, a party may indicate that they will only do business with suppliers that have the highest Better Business Bureau rating possible, or as an alternative, will accept contracts from suppliers who have lower Better Business Bureau ratings as long as the order subject to the contract is insured by a bonding agent. Such attributes are referred to herein as "conditional criteria" and describe the various types of criteria that will be found acceptable to a particular party to the E-marketplace transaction.

Once these criteria, in the form of the attribute certificates, are received by the E-marketplace, the E-marketplace verifies, where appropriate, the attributes to make sure that they are as they are asserted to be. A server in the E-marketplace is configured to determine various combinations that can match the deal criteria with parties who satisfy the criteria. Thus, for example, for a party who requires either a highest Better Business Bureau rating or a lower Better Business Bureau rating but with a bonded contract, the E-marketplace can create a "package" deal by matching a bonding company with a supplier having a lower than highest Better Business Bureau rating, thereby meeting the requirements of the potential purchaser. In this manner, the E-marketplace choreographs the transaction to meet the needs of all.

DETAILED DESCRIPTION OF THE PREFERRED EMBODIMENTS

The present invention utilizes "attribute certificates" to provide transactional information related to the parties to a transaction (e.g., a buyer and/or seller) and/or third party (shipper, insurer, etc.). An E-marketplace gathers the various attribute certificates provided by sellers, buyers, and third parties in potential transactions and then "packages" potential deals that match the requirements of the purchaser. As discussed above, attribute certificates are well-known and it is not the attribute certificate itself that is the subject of the present invention but rather a novel method of using attribute certificates in electronic transactions.

The following terms used herein are defined as follows.

"Identity information" means information and other data that identifies a prospective party to a transaction, and includes such information as the name, address, email address, telephone number of the potential participant;

"non-identity information" means information or data pertaining to a transaction with which a potential participant may be involved, and includes such information as quantities of a particular item needed, quantities of a particular item available for sale, credit information, delivery information, etc. Non-identity information, by definition, excludes identity information.

Figure 1:
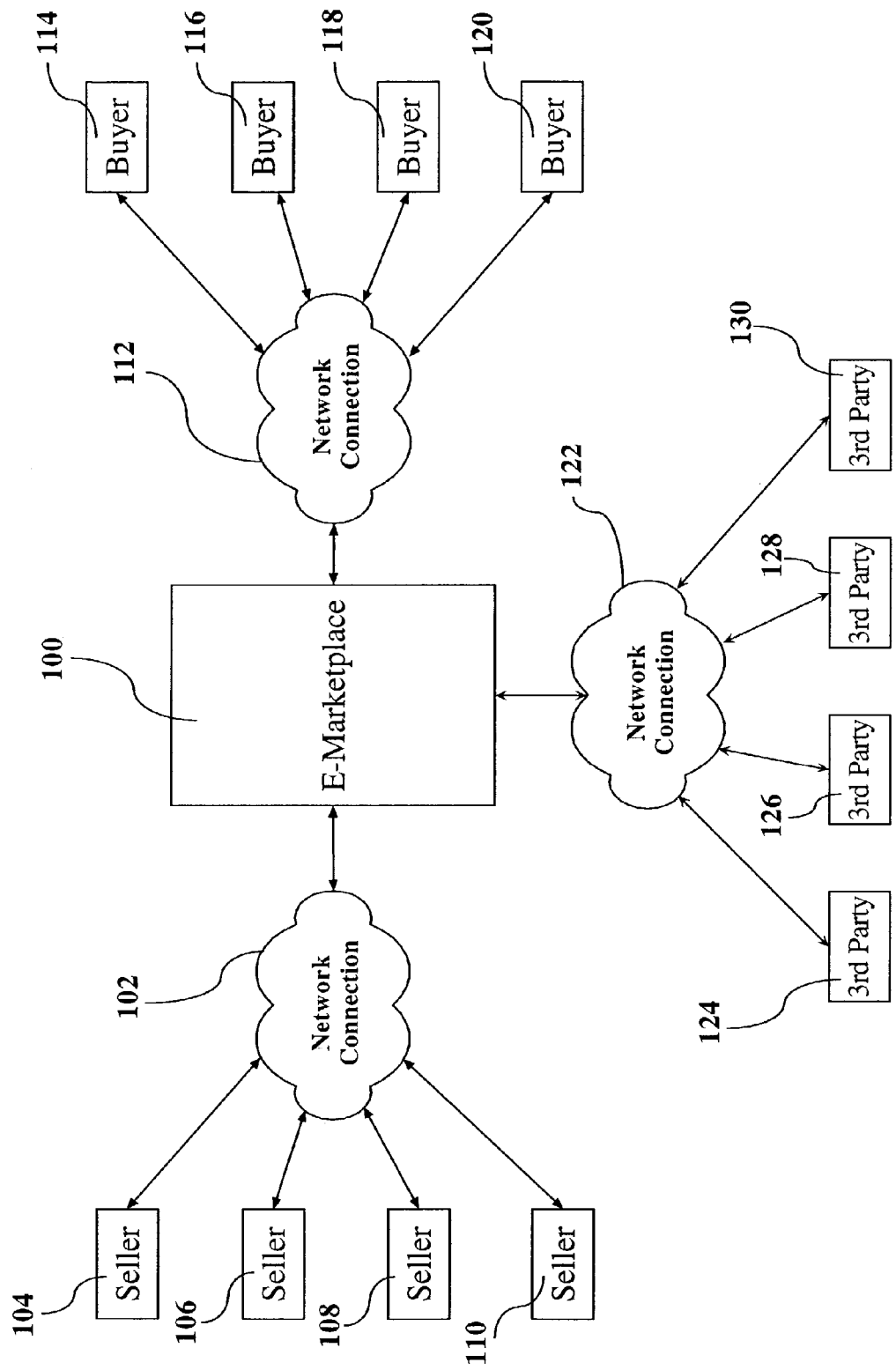
FIG. 1 illustrates a typical E-marketplace environment in which the present invention can be practiced.

FIG. 1 illustrates a typical E-marketplace environment in which the present invention can be practiced. An E-marketplace 100 is coupled to a plurality of sellers 104, 106, 108 and 110 via a network connection 102 (e.g., the Internet). Similarly, E-marketplace 100 is connected to a plurality of buyers 114, 116, 118, and 120 via a network connection 112. Further, a plurality of third-party participants 124, 126, 128 and 130 access the E-marketplace via a network connection 122.

Typically, the E-marketplace 100 will comprise a server configured to receive communications from the network connections 102, 112, and 122; store information for viewing by parties connecting to the network connections 102, 112, and 122; and store other information pertaining to transactions which may occur in the E-marketplace. Sellers 104, 106, 108, and 110, buyers 114, 116, 118, and 120, and third party participants 124, 126, 128, and 130 typically use PC workstations, networks or other known means for accessing the E-marketplace via the network connections 102, 112, and 122.

In a typical electronic transaction using the environment illustrated in FIG. 1, a seller, e.g., seller 104, will connect to E-marketplace 100 via the network connection 102 and register with the E-marketplace. Seller 104 may identify itself by pseudonym and typically will be required to provide real name, address information, e-mail address and other information for identification purposes.

Seller 104 will also provide information regarding a particular transaction (e.g., the availability for sale of a particular IC chip) for use by potential purchasers in evaluating purchases, as well as by the E-marketplace to attract potential purchasers. This information might include quantities available for purchase, pricing information, delivery information, payment terms that will be accepted, ratings by third parties (e.g., Better Business Bureau), and the like. Much of this information may be important to only one particular transaction, but not to another.

In accordance with the present invention, the specific information pertaining to attributes of the sale are provided to the E-marketplace using an attribute certificate so that they will be available to all interested in participating in the bidding/negotiating process with respect to the transaction. The attribute certificate describes the attributes of the transaction but does not necessarily disclose or describe the identity of the seller.

In accordance with the present invention, the same type of information is provided to the E-marketplace by potential buyers. For example, buyer 114 can provide an attribute certificate to E-marketplace 100 via network connection 112. The attribute certificate from the buyer might include desired quantities for purchase, as well as credit history, financial information, and the like. In accordance with the present invention, the buyer also supplies "conditional criteria" detailing alternative conditions under which the buyer will transact business.

In addition to the attribute certificates provided by the buyers and the sellers, in accordance with the present invention, third parties who can provide services related to the transaction, e.g., shipping companies, insurance companies, bonding companies, assembling companies, etc., also provide attribute certificates defining the services that they are able to provide and the conditions under which they can provide them. For example, a shipping company might indicate that they can guarantee shipping coast-to-coast in two days for deliveries not exceeding 500 lbs.; insurers might agree to insure contracts which involve a seller who has a low Better Business Bureau rating, etc. Any party that might be involved in the purchase or sale of a commodity or service in the E-marketplace can provide attribute certificates defining the conditions under which they can provide their service or product, and include conditional criteria where appropriate.

Figure 2:
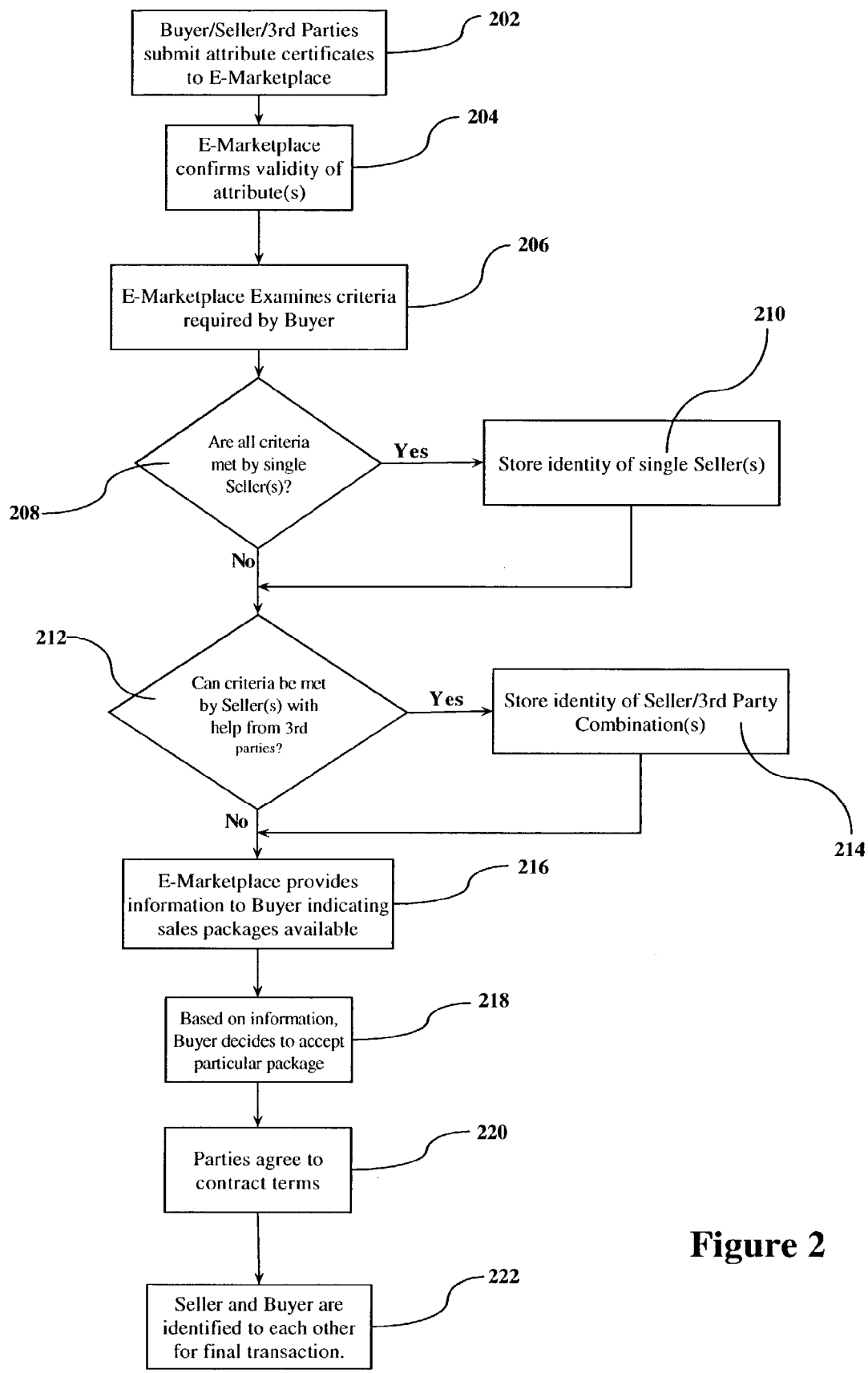
FIG. 2 is a flowchart illustrating the basic steps performed in accordance with the present invention.

FIG. 2 is a flowchart illustrating the basic steps performed in accordance with the present invention. At step 202, a buyer, seller and/or third party participant submits an attribute certificate to the E-marketplace. This may involve completion of a form provided by the E-marketplace which solicits specific information to be put into the attribute certificate regarding details of or criteria for a particular purchase or desired purchase, although use of a form for providing this information is not necessary.

At step 202, the E-marketplace confirms the validity of any and all attributes submitted by the buyers, sellers, and third party participants. If the E-marketplace determines that any of the attributes which were submitted are invalid, then they will be omitted and not provided in response to inquiries about a particular transaction and/or a particular party. If, however, the attributes are valid, then they will be available for us in the E-marketplace.

In accordance with the present invention, at step 206 the E-marketplace examines the criteria required by a particular buyer, as set forth in the buyer's attribute certificate, and at step 208, determines if all criteria set forth by that particular buyer can be met by a single seller. If all criteria can be met, then at step 210, the E-marketplace stores the identity of this single seller (or all sellers that can meet the criteria) and the process moves to step 212. At step 212, a determination is made as to whether or not the criteria can be met by one or more sellers with help from one or more third parties. If yes, then the E-marketplace stores the identities of the seller and third party combination that can meet the criteria and then the process proceeds to step 216. At step 216, the E-marketplace provides the information stored in steps 210 and 214 to the appropriate buyer and indicates the various "sales packages" available on the E-marketplace that will meet the buyer's needs. At step 218, based on the information supplied from the E-marketplace, the buyer decides to accept a particular package. At step 220, the parties agree to contract terms, and at step 222, if desired, the seller and the buyers are identified to each other for the final transaction. Third parties involved in the transaction can also be identified. It is understood, however, that situations may arise where some or all of the participants to the transaction may wish to remain anonymous, and it is understood that the present invention covers such situations.

Using the present invention, the E-marketplace screens and classifies buyers and sellers and finds appropriate matches and, where a single party cannot satisfy the needs of a buyer, packages two or more parties together to meet the need. This minimizes the need of the sellers, buyers, and third parties to make such arrangements on their own and increases the probability that deals will be made which meet everybody's requirements. The identities of the parties remain anonymous until it is desired to reveal them.

Following is an example illustrating the use of attribute certificates in accordance with the present invention. Assume for this example that a Fortune 500 company called XYZ Corporation wishes to be able to purchase 10,000 units of widget A per month for a period of two years. As a Fortune 500 company, XYZ Corporation is aware that smaller companies may charge higher than average prices simply in view of the fact that they are selling to a large corporation with a "deep pocket". Accordingly, they wish to remain anonymous in the transaction.

Suppose also that a smaller corporation, ABC, Inc. is able to produce only a portion of the volume needed by XYZ Corporation, e.g., 6,000 units of widget A per month for two years. An additional corporation, DEF Corporation, can supply 5,000 units of widget A per month for two years. Further, insurance company HIJ Corporation, is able to guarantee the shipments of 10,000 units of widget A from ABC Corporation and DEF Corporation, combined. In accordance with the present invention, the services and products available by the combined efforts of ABC Inc., DEF Corporation, and HIJ Corporation are "packaged" and presented to buyer XYZ Corporation as an "entity" able to satisfy their purchasing requirements. Others may also be able to do the same, and the E-marketplace identifies these entities to the XYZ Corporation as well.

When all of this information is provided to the buyer XYZ Corporation, they are able to peruse the other details of the transaction information provided by the identified entities, e.g., price, availability, and the like, and the buyer is then in a position to make its final decision. All parties benefit because deals are created and transacted in a prompt and efficient manner with little additional work on the part of the parties themselves. The E-marketplace, using the information in the attributes certificates, provides this packaging service as one of the services it provides to its users.

The present invention can be embodied in either hardware or software. In a preferred embodiment, the present invention is embodied in software code residing on the E-marketplace server(s) to carry out the described steps and functions.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as in the permanent storage of a workstation or server maintained by the E-Marketplace. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A computer-implemented method of conducting an electronic commerce transaction having predefined satisfaction requirements set forth by a requesting party, comprising executing computer code on a processor, said computer code:

creating an attribute certificate for each prospective participant to said transaction, wherein each attribute certificate contains non-identity information pertaining to said transaction;

submitting each of said attribute certificates to a third party;

validating each of said attribute certificates, wherein said validation step comprises checking the accuracy of each non-identity element;

identifying, based on said validated attribute certificates, combinations of two or more prospective participants who, together, can satisfy said predefined satisfaction requirements;

designating each of said combinations of two or more prospective participants who together can satisfy said predefined satisfaction requirements as a distinct entity; and conveying each of said entity designations to said requesting party.

2. A method as set forth in claim 1, wherein each of said attribute certificates contains only non-identity information pertaining to said transaction.

3. A method as set forth in claim 2, wherein said processor is operated by said third party.

4. A method as set forth in claim 3, wherein said non-identity information comprises one or more non-identity elements and wherein said validation step further comprises deleting from said attribute certificate those non-identity elements that are inaccurate.

5. A method as set forth in claim 3, wherein said non-identity information comprises one or more non-identity elements and wherein said validation step further comprises deleting any attribute certificate that contains an inaccurate non-identity element.

6. A method as set forth in claim 3, wherein said third party comprises an E-marketplace.

7. A computer system for conducting an electronic commerce transaction having predefined satisfaction requirements set forth by a requesting party, comprising:
   a processor, said processor executing code to:
      create an attribute certificate for each prospective participant to said transaction, wherein each attribute certificate contains non-identity information pertaining to said transaction;
      submit each of said attribute certificates to a third party;
      validate each of said attribute certificates, wherein said validation step comprises checking the accuracy of each non-identity element;
      identify, based on said validated attribute certificates, combinations of two or more prospective participants who can, together, satisfy said predefined satisfaction requirements;
      designate each of said combinations of two or more prospective participants who together can satisfy said predefined satisfaction requirements as a distinct entity; and
      convey each of said entity designations to said requesting party.

8. A system as set forth in claim 7, wherein each of said attribute certificates contains only non-identity information pertaining to said transaction.

9. A system as set forth in claim 8, wherein said processor is used by said third party to validate each of said attribute certificates.

10. A system as set forth in claim 9, wherein said non-identity information comprises one or more non-identity elements and wherein said processor executes code to:
   delete from said attribute certificate those non-identity elements that are inaccurate.

11. A system as set forth in claim 9, wherein said non-identity information comprises one or more non-identity elements and wherein said processor executes code to:
   delete any attribute certificate that contains an inaccurate non-identity element.

12. A system as set forth in claim 9, wherein said third party comprises an E-marketplace.

13. A computer program product recorded on computer-readable storage medium, for conducting, using a computer, an electronic commerce transaction having predefined satisfaction requirements set forth by a requesting party, comprising:
   computer-readable program code executed on said computer to create an attribute certificate for each prospective participant to said transaction, wherein each attribute certificate contains non-identity information pertaining to said transaction;
   computer-readable program code executed on said computer to submit each of said attribute certificates to a third party;
   computer-readable program code executed on said computer to validate each of said attribute certificates, wherein said validation step comprises checking the accuracy of each non-identity element;
   computer-readable program code executed on said computer to identify, based on said validated attribute certificates, combinations of two or more prospective participants who, together, can satisfy said predefined satisfaction requirements;
   computer-readable program code executed on said computer to designate each of said combinations of two or more prospective participants who together can satisfy said predefined satisfaction requirements as a distinct entity; and
   computer-readable program code executed on said computer to convey each of said entity designations to said requesting party.

14. A computer program product as set forth in claim 13, wherein each of said attribute certificates contains only non-identity information pertaining to said transaction.

15. A computer program product as set forth in claim 14, wherein said computer-readable program code executed on said computer to validate each of said attribute certificates is used by said third party to validate each of said attribute certificates.

16. A computer program product as set forth in claim 15, wherein said non-identity information comprises one or more non-identity elements and wherein said computer-readable program code executed on said computer to validate each of said attribute certificates comprises:
   computer-readable program code executed on said computer to delete from said attribute certificate those non-identity elements that are inaccurate.

17. A computer program product as set forth in claim 15, wherein said non-identity information comprises one or more non-identity elements and wherein said computer-readable program code executed on said computer to validate each of said attribute certificates comprises:
   computer-readable program code executed on said computer to delete any attribute certificate that contains an inaccurate non-identity element.

18. A computer program product as set forth in claim 15, wherein said third party comprises an E-marketplace.

19. A method as set forth in claim 1, wherein conveying each of said entity designations to said requesting party further comprises presenting at least one combination of two or more prospective participants as a single entity to the requesting party.

20. A computer program product as set forth in claim 13, wherein the computer-readable program code executed on said computer to convey each of said entity designations to said requesting party further comprises computer-readable program code executed on said computer to present at least one combination of two or more prospective participants as a single entity to the requesting party.

* * * * *